(12) United States Patent
Ode et al.

(10) Patent No.: US 9,606,425 B2
(45) Date of Patent: Mar. 28, 2017

(54) IMAGING OPTICAL SYSTEM, OPTICAL APPARATUS AND IMAGE PROJECTION APPARATUS

(71) Applicant: CANON KABUSHIKI KAISHA, Tokyo (JP)

(72) Inventors: Takashi Ode, Utsunomiya (JP); Kazuhiro Inoko, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/184,370

(22) Filed: Jun. 16, 2016

(65) Prior Publication Data

US 2016/0370692 A1     Dec. 22, 2016

(30) Foreign Application Priority Data

Jun. 19, 2015  (JP) ................................. 2015-123493
Jun. 14, 2016  (JP) ................................. 2016-117815

(51) Int. Cl.
| | |
|---|---|
| H04N 5/74 | (2006.01) |
| G03B 21/14 | (2006.01) |
| G02B 27/00 | (2006.01) |
| G02B 17/08 | (2006.01) |
| G03B 21/28 | (2006.01) |
| H04N 9/31 | (2006.01) |

(52) U.S. Cl.
CPC ....... *G03B 21/147* (2013.01); *G02B 17/0852* (2013.01); *G02B 27/0025* (2013.01); *G03B 21/28* (2013.01); *H04N 9/315* (2013.01)

(58) Field of Classification Search
CPC ........ H04N 5/74; H04N 9/315; A01B 12/006; G03B 21/147; G03B 21/28; G02B 27/0025; G02B 17/0852
USPC ................. 348/759, 240.99–240.3, 335–369; 359/676, 689, 678, 882, 686
See application file for complete search history.

(56) References Cited

U.S. PATENT DOCUMENTS

| | | | |
|---|---|---|---|
| 6,631,994 B2 | 10/2003 | Suzuki et al. | |
| 6,728,482 B2* | 4/2004 | Hagimori | H04N 5/2254 348/E5.028 |
| 6,898,023 B2* | 5/2005 | Takeuchi | G02B 13/0045 359/676 |

(Continued)

FOREIGN PATENT DOCUMENTS

| | | |
|---|---|---|
| JP | 3727543 B2 | 12/2005 |
| JP | 4223936 B2 | 2/2009 |
| JP | 5484098 B2 | 5/2014 |

*Primary Examiner* — Trang U Tran
(74) *Attorney, Agent, or Firm* — Rossi, Kimms & McDowell LLP (57) ABSTRACT

An imaging optical system, which images an image on one conjugate surface of an enlargement side conjugate surface and a reduction side conjugate surface onto the other conjugate surface, includes, in order from the reduction side conjugate surface to the enlargement side conjugate surface, a refractive optical system and a reflective optical system. The refractive optical system forms an intermediate real image at an intermediate imaging position inside the refractive optical system. The reflective optical system includes a convex mirror disposed closest to the enlargement side conjugate surface. The predetermined conditional expression is satisfied.

11 Claims, 3 Drawing Sheets

(56) References Cited

U.S. PATENT DOCUMENTS

| | | | |
|---|---|---|---|
| 6,980,369 B2* | 12/2005 | Ishikawa | G02B 15/177 |
| | | | 359/676 |
| 7,048,388 B2 | 5/2006 | Takaura et al. | |
| 7,372,635 B2* | 5/2008 | Morooka | G02B 15/173 |
| | | | 359/678 |
| 7,636,201 B2* | 12/2009 | Sudoh | G02B 15/173 |
| | | | 359/676 |
| 8,337,024 B2 | 12/2012 | Kuwata et al. | |
| 8,711,488 B2* | 4/2014 | Kubota | G02B 15/177 |
| | | | 359/678 |
| 9,030,541 B2* | 5/2015 | Kutsuma | A61B 1/00188 |
| | | | 348/61 |
| 2003/0214726 A1* | 11/2003 | Mihara | G02B 15/177 |
| | | | 359/676 |
| 2004/0184163 A1* | 9/2004 | Nishioka | G02B 13/0045 |
| | | | 359/726 |
| 2009/0097128 A1* | 4/2009 | Yokoyama | G02B 25/001 |
| | | | 359/645 |
| 2015/0253543 A1* | 9/2015 | Mercado | G02B 13/002 |
| | | | 348/370 |

\* cited by examiner

IMAGING OPTICAL SYSTEM, OPTICAL APPARATUS AND IMAGE PROJECTION APPARATUS

BACKGROUND OF THE INVENTION

Field of the Invention

The present invention relates to an imaging optical system suitable for an optical apparatus such as an image pickup apparatus and an image projection apparatus.

Description of the Related Art

An imaging optical system that combines a refractive optical system with a reflective optical system to achieve especially a wide angle has been known. Japanese Patent No. 3727543 discloses an imaging optical system that combines a refractive optical system of a retrofocus type with a convex mirror as a reflective optical system. Japanese Patent No. 4223936 also discloses an imaging optical system that combines a refractive optical system of a retrofocus type with a concave mirror having a positive power as a reflective optical system.

However, in the imaging optical systems disclosed in Japanese Patent No. 3727543 and Japanese Patent No. 4223936, since an off-axis lay should be strongly bent according to a wider angle, large distortion easily occurs. Using a large-diameter mirror and a large-diameter lens is required to properly correct it.

To solve the above problem, an imaging optical system disclosed in Japanese Patent No. 5484098 forms an intermediate real image inside a refractive optical system to reduce a diameter of a convex mirror disposed on the most enlargement side conjugate surface side.

However, the imaging optical system disclosed in Japanese Patent No. 5484098 fails to properly set a power ratio of the refractive optical system to the convex mirror, and thus cannot excellently correct various aberrations such as distortion, a field curvature and a chromatic aberration of magnification.

SUMMARY OF THE INVENTION

The present invention provides an imaging optical system, which includes a refractive optical system and a reflective optical system (convex mirror), capable of reducing a diameter of the reflective optical system and excellently correcting various aberrations, and an optical apparatus with the imaging optical system.

An imaging optical system according to one aspect of the present invention images an image on one conjugate surface of an enlargement side conjugate surface and a reduction side conjugate surface onto the other conjugate surface. The imaging optical system includes, in order from the reduction side conjugate surface to the enlargement side conjugate surface, a refractive optical system and a reflective optical system. The refractive optical system forms an intermediate real image at an intermediate imaging position inside the refractive optical system. The reflective optical system includes a convex mirror disposed closest to the enlargement side conjugate surface. The following conditional expression is satisfied:

$$0.01 \leq |fL/fM| \leq 0.50$$

where fL is a focal length of the refractive optical system, and fM is a focal length of the reflective optical system.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Firstly, common subject matters of each embodiment described below will be explained. An imaging optical system images an image on one conjugate surface of an enlargement side conjugate surface and a reduction side conjugate surface onto the other conjugate surface, and includes, in order from the reduction side conjugate surface to the enlargement side conjugate side, a refractive optical system and a reflective optical system.

The refractive optical system forms an intermediate real image of the image on the one conjugate surface therein. The refractive optical system includes a first partial refractive optical system disposed between the reflective optical system and an intermediate imaging position in which the intermediate real image is formed, and a second partial refractive optical system disposed between the intermediate imaging position and the reduction side conjugate surface. As just described, the refractive optical system according to each embodiment is a reimaging refractive optical system. Additionally, the reflective optical system is configured by a convex mirror.

In each embodiment, setting both of a power ratio of the convex mirror and a whole system of the refractive optical system (hereinafter, referred to as "a whole refractive optical system") including the first and second partial refractive optical system and lateral magnification of the intermediate real image within a proper range excellently corrects various aberrations such as distortion, a field curvature and a chromatic aberration of magnification.

The first and second partial refractive optical systems that are respectively disposed on an enlargement side conjugate surface side and a reduction side conjugate surface side across the intermediate imaging position perform an aberration correction. Moreover, disposing the convex mirror on the most enlargement side conjugate surface side in this imaging optical system can reduce a load with respect to the aberration correction of the second partial refractive optical system and can perform the further excellent aberration correction. Then, setting a power of the convex mirror within a proper range leads to appropriately correct an aberration generated outside an axis mainly.

A mirror such as a convex mirror has an advantage in which a chromatic aberration is suppressed, but excessively strengthening the power generates large distortion being an aberration outside the axis and correcting this distortion using the second partial refractive optical system is difficult. Thus, properly setting both of the power ratio of the convex mirror and the whole refractive optical system and the lateral magnification of the intermediate real image can excellently correct aberrations outside the axis such as a field curvature, distortion and a chromatic aberration of magnification.

Secondly, conditions that the power ratio of the convex mirror and the whole refractive optical system and the lateral magnification of the intermediate real image should satisfy will be specifically explained. In each embodiment, disposing the convex mirror having the proper power on the most enlargement side conjugate surface side excellently corrects aberrations generated at a position in which an off-axis main ray is high without generating a chromatic aberration of magnification. Herein, a focal length of the whole refractive optical system is represented by fL, and a focal length of the convex mirror (reflective optical system) is represented by fM. In this case, the focal lengths fL and fM satisfy the following conditional expression.

$$0.01 \leq |fL/fM| \leq 0.50 \quad (1)$$

The expression (1) is a condition regarding a contribution ratio to a wide angle of the reimaging refractive optical system forming the intermediate real image inside the whole refractive optical system and the convex mirror when the reimaging refractive optical system is combined with the convex mirror. Setting the term fL/fM to exceed the upper limit of the expression (1) is not favorable because a load of the convex mirror to a wide angle becomes too large, lenses of the whole refractive optical system fails to fully correct a large field curvature generated by the convex mirror, and distortion enormously occurs. Setting the term fL/fM to fall below the lower limit is also not favorable because a load of the convex mirror to the aberration correction extremely decreases and the convex mirror hardly contributes to a wide angle.

It is further preferable that the numerical value range of the expression (1) is changed as the following conditional expression (1)'.

$$0.02 \leq |fL/fM| \leq 10.25 \quad (1)'$$

Furthermore, a lateral magnification between the image on the reduction side conjugate surface and the intermediate real image (a magnification in imaging the image on the reduction side conjugate surface as the intermediate real image by the second partial refractive optical system) is represented by β, and the lateral magnification β is less than −1.0 when the intermediate real image is larger than the image on the reduction side conjugate surface. The lateral magnification β further satisfies the following conditional expression.

$$-2.0 \leq \beta \leq -0.5 \quad (2)$$

When the intermediate real image reduces than the image on the reduction side conjugate surface, the lateral magnification β is within a range of −1<β<0. When the lateral magnification β is within the range of the expression (2), an excellent chromatic aberration correction can be performed. Setting the lateral magnification β to fall below the lower limit of the expression (2) is not favorable because an axial chromatic aberration on the reduction side conjugate surface to which the square of the lateral magnification β is added increases. Meanwhile, setting the lateral magnification β to exceed the upper limit of the expression (2) is not favorable because a height of an off-axis main ray forming the intermediate real image becomes higher and as a result, a diameter of a lens enlarges.

It is further preferable that the numerical value range of the expression (2) is changed as the following conditional expression (2)'.

$$-1.5 \leq \beta \leq -0.7 \quad (2)'$$

The lower and upper limits of the expression (2)' may be respectively 1.30 and −1.01.

Satisfying the following conditional expression in addition to the above expressions (1) and (2) is preferable to perform the further excellent aberration correction.

A focal length of the first partial refractive optical system is represented by f11, and a focal length of the second partial refractive optical system is represented by f12. In this case, the focal lengths f11 and f12 desirably satisfy the following conditional expression.

$$0.3 \leq |f11/f12| \leq 0.8 \quad (3)$$

The expression (3) is a condition regarding a sharing ratio of a wide angle of the first and second partial refractive optical systems. Deviating the term |f11/f12| from the range of the expression (3) increases a load to a wide angle of either of the first and second partial refractive optical systems and thereby, distortion generated in one of the partial refractive optical systems cannot be corrected by the other of the partial refractive optical systems. Thus, since a favorable aberration correction cannot be performed, deviating the term |f11/f12| from the range of the expression (3) is not preferable. In addition, sine a power of one of the partial refractive optical systems becomes too large and thereby, a spherical aberration cannot be excellently corrected due to this partial refractive optical system, deviating the term |f11/f12| from the range of the expression (3) is not preferable.

It is further preferable that the numerical value range of the expression (3) is changed as the following conditional expression (3)'.

$$0.4 \leq |f11/f12| \leq 0.6 \quad (3)'$$

Besides, of the whole refractive optical system in each embodiment, lenses are respectively referred to as a first lens, a second lens and a third lens . . . in order from the most convex mirror side (reflective optical system side). Making a surface of the first lens disposed on the most convex mirror side an aspherical shape can suppress distortion. Additionally, designing a lens close to the intermediate real image so as to make a surface of the lens an aspherical shape and to have a negative power can correct distortion. Further, making a surface of a lens disposed on the most reduction side conjugate surface side an aspherical shape can suppress distortion.

Moreover, in each embodiment, an effective diameter of the first lens is represented by ΦG1, and a lens having the largest effective diameter in lenses other than the first lens of the whole refractive optical system is represented by ΦGmax. In this case, the effective diameters ΦG1 and ΦGmax preferably satisfy the following conditional expression to excellently correct a chromatic aberration of magnification.

$$0.2 \leq \Phi G1/\Phi Gmax \leq 2.0 \quad (4)$$

Setting the term ΦG1/ΦGmax to fall below the lower limit of the expression (4) extremely minifies the effective diameter of the first lens relative to the whole refractive optical system and thereby, a light flux for each image height of an off-axis ray overlaps. As a result, even if the surface of the first lens is made an aspherical shape, correcting distortion is difficult and thus, setting the term ΦG1/ΦGmax to fall below the lower limit of the expression (4) is not favorable. Setting the term ΦG1/ΦGmax to exceed the upper limit of the expression (4) is also not favorable because though light for each image height transmitting the first lens does not overlap with each other and an off-axis aberration can be excellently corrected, the effective diameter of the first lens enlarges.

It is further preferable that the numerical value range of the expression (4) is changed as the following conditional expression (4)'.

$$0.5 \leq \Phi G1/\Phi Gmax \leq 1.2 \quad (4)'$$

Further, in each embodiment, a distance between the convex mirror and the first lens is represented by D, and a total length of a whole system of the imaging optical system (a distance between the lens disposed on the most reduction side conjugate surface side and the lens disposed on the most convex mirror side) is represented by TL. In this case, the distance D and the total length TL favorably satisfy the following conditional expression.

$$0.01 \leq D/TL \leq 0.30 \quad (5)$$

Setting the term D/TL to exceed the upper limit of the expression (5) excessively widens a distance between the convex mirror and the first lens relative to the length of the whole system of the imaging optical system. Accordingly, the effective diameter of the convex mirror set so that the focal lengths fM, f11 and f12 satisfy the above conditions must be increased. Meanwhile, setting the term D/TL to fall below the lower limit of the expression (5) is required to reflect light incident to the convex mirror by the convex mirror while making an angle of view wider. In other words, setting the term D/TL to fall below the lower limit of the expression (5) is not favorable because the power of the convex mirror must be strengthened and thus, a large off-axis aberration occurs.

It is further preferable that the numerical value range of the expression (5) is changed as the following conditional expression (5)'.

$$0.05 \leq D/TL \leq 0.20 \quad (5)'$$

Besides, it is preferable that two lights respectively having a maximum reflection angle and a minimum reflection angle in the convex mirror do not cross each other between the first lens and the convex mirror. Thereby distortion can be suppressed.

The imaging optical system explained in each embodiment can be applied to a projection optical system for an image projection apparatus as one optical apparatus and to an image pickup optical system for an image pickup apparatus (image reading apparatus) as other optical apparatus. Each embodiment discloses a light modulation element modulating light from a light source and an example of an imaging optical system (a projection optical system) projecting light from the light modulation element onto a projection surface such as a screen.

First Embodiment

Figure 1:
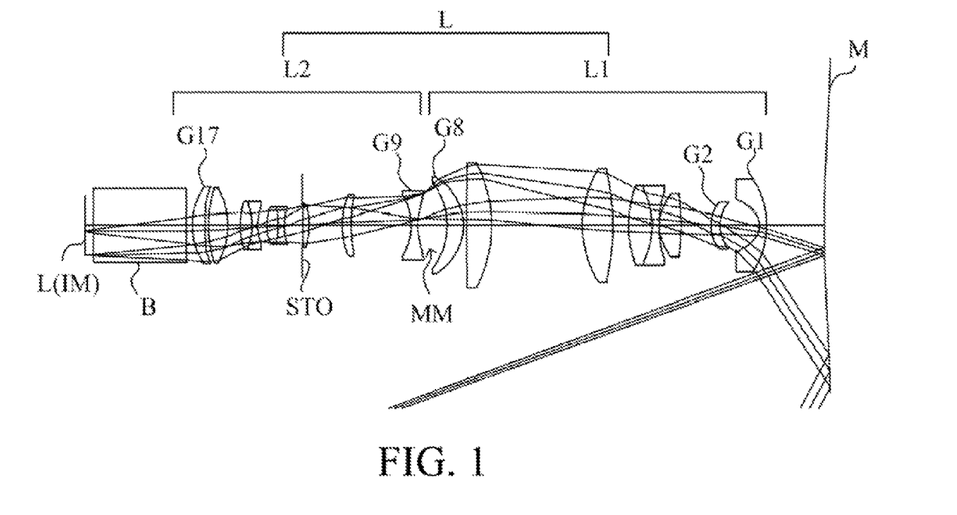
FIG. 1 is a sectional view of an imaging optical system according to a first embodiment of the present invention.

FIG. 1 illustrates a configuration of a wide angle projection optical system as an imaging optical system according to a first embodiment. Using such a wide angle projection optical system can project a large size image at a short projection distance (a distance between an image projection apparatus and a projection surface).

In FIG. 1, light emitted from a light modulation element L disposed on a reduction side conjugate surface transmits a second partial refractive optical system L2 and a first partial refractive optical system L1 of a whole refractive optical system L in that order and is reflected by a convex mirror M toward an enlargement side conjugate surface (not illustrated). When lenses of the whole refractive optical system L are referred to as a first lens G1 and a second lens G2 . . . in order from the most convex mirror side, a first partial refractive optical system L1 includes first to eighth lenses G1 to G8. Additionally, a second partial refractive optical system L2 includes ninth to seventeenth lenses G9 to G17. Further, an intermediate real image is formed at an intermediate imaging position MM between the eighth and ninth lenses G8 and G9. Symbol STO denotes a diaphragm and B an optical block such as a prism. Explanation of these symbols is the same as the other embodiments described below. The diaphragm is a member separate from the lenses in this embodiment, but is not limited to this. Specifically, a lens holder may be used instead of a diaphragm. For example, in a first numerical example, a lens holder of the lens surface 22 (or 21) or a lens holder of the lens surface 24 (or 25) may double as a diaphragm.

Moreover, an image pickup optical system having the same configuration as this embodiment can be used for an image pickup apparatus. The image pickup apparatus images an object on an enlargement side conjugate surface using an image pickup element, such as a CCD sensor and a CMOS sensor, disposed a reduction side conjugate surface. Such an image pickup apparatus can shorten an object distance (a distance between an image pickup apparatus and an object) and can image a large size object.

Table 1 provides a numerical example according to this embodiment. In Table 1, surfaces of the convex mirror and each lens are numbered as a surface number in order from the enlargement side conjugate surface to the reduction side conjugate surface. Symbol R denotes a radius of curvature, d a surface distance (a real space distance between surfaces adjacent to each other), $n_d$ and $v_d$ respectively a refractive index and an abbe number relative to a d-line of a glass material of a lens. Symbol $\Phi_{ea}$ denotes an effective diameter of a mirror or a lens (a diameter of an effective region contributing to optical effect). Furthermore, a surface that a sign on a left side of the surface number is marked has an aspherical shape in accordance with the following function (A). Variable x denotes a coordinate in a direction parallel to an optical axis AXL of the imaging optical system (refractive optical system L), and variable y a distance (a height) from the optical axis AXL. Symbol R denotes a radius of curvature, and K a conic constant. Constants A, B, C, D and E denote aspherical coefficients. Table 1 provides the aspherical coefficients in the function. Symbol "E-M" means "×10$^{-M}$". The variable y denotes a coordinate in a radial direction, and x a coordinate in an optical axis direction. Symbol OB denotes the enlargement side conjugate surface, IM the reduction side conjugate surface. Symbol f denotes a focal length, FNO F number. Explanation of Table 1 is the same as the other embodiments described below.

$$x=(y^2/R)/[1+\{1-(1+K)(y^2/R^2)\}^{1/2}]+Ay^4+By^6+Cy^8+Dy^{10}+Ey^{12}+Fy^{14} \quad (A)$$

TABLE 1

| Surface Number | R [mm] | d [mm] | nd | vd | Φ ea [mm] |
|---|---|---|---|---|---|
| OB |  | 360.00 |  |  |  |
| *1 | 349.38 | −17.86 | REF | REF | 101.60 |
| *2 | −28.99 | −2.22 | 1.69 | 53.20 | 27.70 |
| *3 | −5.82 | −12.23 |  |  | 16.08 |
| 4 | 11.26 | −2.92 | 1.49 | 70.24 | 13.51 |
| 5 | 11.79 | −9.29 |  |  | 13.58 |
| *6 | −69.61 | −6.71 | 1.50 | 81.56 | 16.98 |
| *7 | 13.51 | −0.10 |  |  | 18.62 |
| 8 | 33.79 | −2.25 | 1.89 | 20.36 | 18.97 |
| 9 | −26.84 | −7.18 | 1.49 | 70.24 | 21.25 |
| 10 | 36.84 | −4.93 |  |  | 23.85 |
| 11 | −75.52 | −9.45 | 1.50 | 81.55 | 32.69 |
| 12 | 33.35 | −28.22 |  |  | 34.02 |
| 13 | −42.15 | −7.75 | 1.89 | 20.36 | 37.95 |
| 14 | 701.05 | −1.06 |  |  | 36.73 |
| 15 | −17.56 | −5.00 | 1.89 | 20.36 | 28.87 |
| 16 | −22.07 | −9.41 |  |  | 26.07 |
| *17 | 14.88 | −2.00 | 1.50 | 81.56 | 20.36 |
| *18 | −19.53 | −18.64 |  |  | 17.94 |
| 19 | 52.73 | −2.80 | 1.89 | 20.36 | 17.47 |
| 20 | 25.07 | −10.34 |  |  | 17.74 |
| 21 | −23.23 | −1.97 | 1.89 | 20.36 | 12.49 |
| 22 | 162.94 | −0.10 |  |  | 12.20 |
| (STO) 23 | ∞ | −5.58 |  |  | 12.09 |
| 24 | 19.54 | −2.00 | 1.72 | 29.23 | 10.38 |
| 25 | −30.58 | −3.35 | 1.69 | 54.82 | 10.49 |
| 26 | 16.55 | −3.00 |  |  | 10.77 |
| 27 | 14.73 | −1.70 | 1.81 | 25.46 | 10.74 |
| 28 | −18.91 | −3.67 | 1.52 | 64.14 | 12.53 |
| 29 | 27.50 | −3.94 |  |  | 13.99 |
| 30 | −24.74 | −5.98 | 1.50 | 81.55 | 21.84 |
| 31 | 36.36 | −0.94 |  |  | 22.24 |
| *32 | 1000.00 | −4.08 | 1.50 | 81.56 | 22.31 |
| *33 | 23.15 | −1.84 |  |  | 22.74 |
| 34 | ∞ | −28.95 | 1.72 | 47.93 | 21.87 |
| 33 | ∞ | −2.48 |  |  | 19.02 |
| IM |  |  |  |  | 18.60 |

| | Surface | | | | | | | |
|---|---|---|---|---|---|---|---|---|
|  | 1 | 2 | 3 | 6 | 7 | 17 | 18 | 32 | 33 |
| K | −53.67101 | 0 | −0.551623 | 0 | 0 | 0 | 0 | 0 | 0 |
| A | −2.02E−07 | −5.02E−05 | 0.0001042 | 2.29E−07 | −5.01E−05 | −0.000348 | −0.000114 | 7.12E−05 | 2.38E−05 |
| B | −1.58E−11 | 5.10E−07 | 1.62E−08 | −4.56E−08 | −2.10E−07 | 2.52E−06 | 2.14E−06 | 4.32E−07 | 2.24E−07 |
| C | 2.05E−14 | −1.97E−09 | −8.06E−09 | 1.15E−09 | 1.14E−10 | −1.32E−08 | −1.87E−08 | −5.11E−09 | −7.73E−10 |
| D | −3.11E−18 | 2.31E−12 | 1.08E−09 | −8.78E−12 | −1.72E−12 | 2.61E−11 | 6.05E−11 | 4.32E−11 | −2.26E−11 |
| E | 0 | −1.46E−15 | −8.39E−12 | 4.25E−14 | −5.36E−15 | −4.24E−15 | 8.40E−15 | −1.98E−13 | 3.17E−13 |
| F | 0 | 3.63E−19 | −7.57E−15 | 0 | 0 | 0 | 0 | −6.96E−16 | −2.23E−15 |
| G | 0 | 4.08E−20 | 4.14E−17 | 0 | 0 | 0 | 0 | 4.24E−18 | 4.65E−18 |

| | |
|---|---|
| f [mm] | 4.97 |
| FNO | 2.31 |
| Angle of view [deg] | 61.6 |

Figure 2:
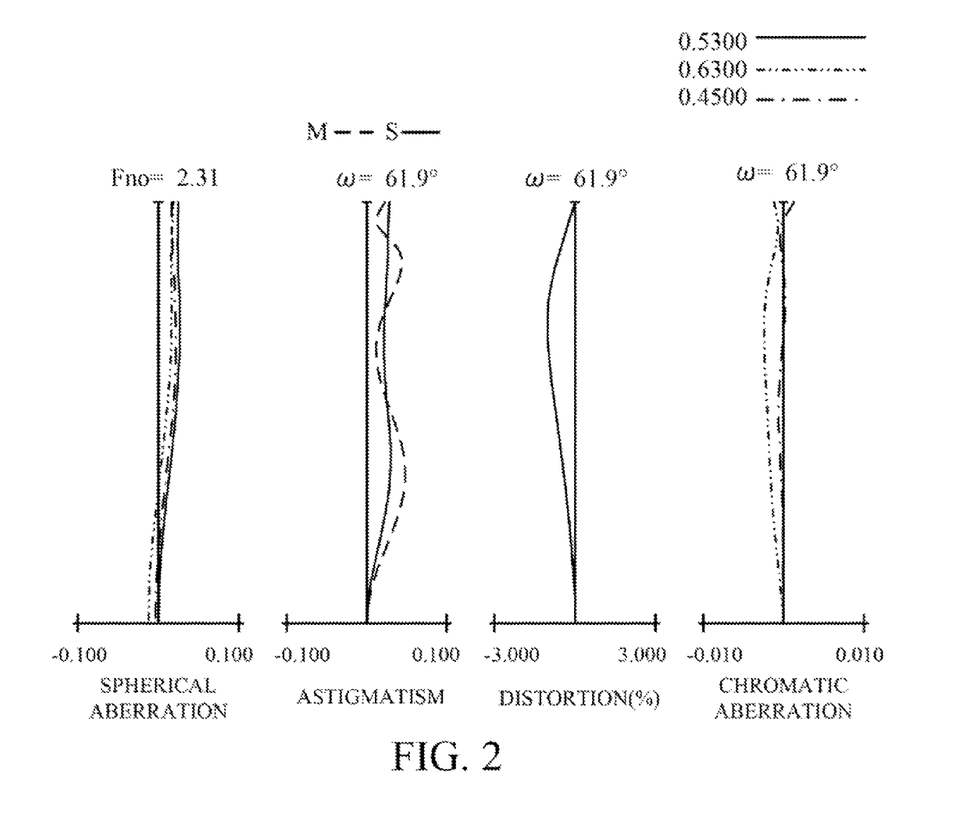
FIG. 2 is a longitudinal aberration diagram of the imaging optical system according to the first embodiment.

FIG. 2 illustrates a longitudinal aberration (an aspherical aberration, astigmatism, distortion and a chromatic aberration of magnification) of the projection optical system according to this embodiment.

Table 2 provides values of the expressions (1) to (5) in this embodiment.

TABLE 2

| | |
|---|---|
| fM [mm] | −174.69 |
| fL [mm] | 5.69 |
| fl1 [mm] | 6.56 |
| fl2 [mm] | 11.74 |
| fL/fM | 0.033 |
| β | −1.11 |

TABLE 2-continued

| | |
|---|---|
| fl1/fl2 | 0.56 |
| ΦG1/ΦGmax | 0.73 |
| D/TL | 0.100 |

Second Embodiment

Figure 3:
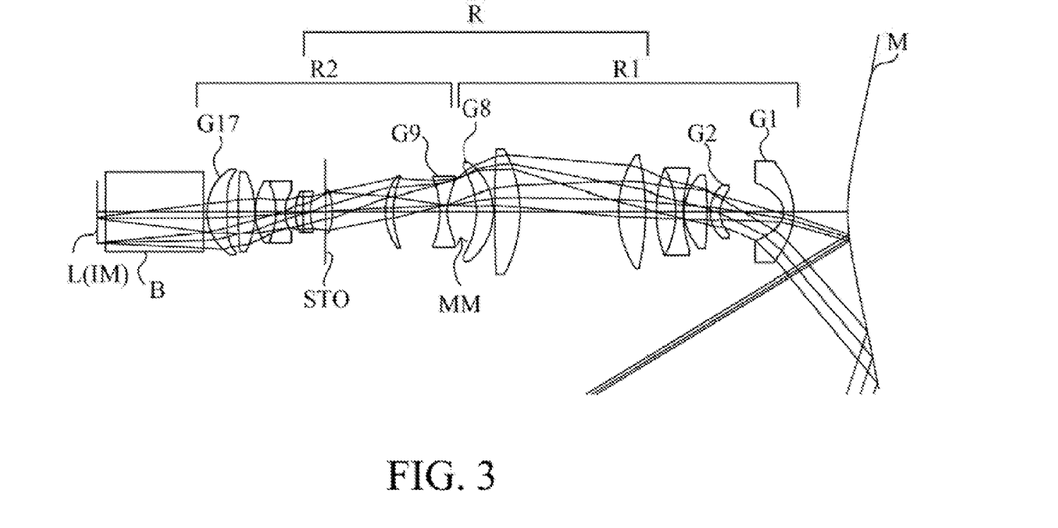
FIG. 3 is a sectional view of an imaging optical system according to a second embodiment of the present invention.

FIG. 3 illustrates a configuration of a projection optical system as an imaging optical system according to a second embodiment. An angle of view of this projection optical system is larger than the angle of view of the projection optical system according to the first embodiment by 72°. Using the projection optical system according to this embodiment can further shorten a projection distance compared to the projection distance of the projection optical system according to the first embodiment. Applying an image pickup optical system having the same configuration to an image pickup apparatus can also further shorten an object distance.

Table 3 provides a numerical example of this embodiment.

TABLE 4

| | |
|---|---|
| fM [mm] | −26.96 |
| fL [mm] | 5.66 |
| fl1 [mm] | 6.50 |
| fl2 [mm] | 11.63 |
| fL/fM | 0.210 |
| β | −1.06 |

TABLE 3

| Surface Number | R [mm] | d [mm] | nd | νd | Φ ea [mm] |
|---|---|---|---|---|---|
| OB | | 360.00 | | | |
| *1 | 53.93 | −15.93 | REF | REF | 102.52 |
| *2 | −20.27 | −2.97 | 1.69 | 53.20 | 28.85 |
| *3 | −5.26 | −18.76 | | | 17.16 |
| 4 | 9.21 | −2.93 | 1.49 | 70.24 | 11.82 |
| 5 | 10.68 | −0.95 | | | 14.60 |
| *6 | −115.92 | −6.87 | 1.50 | 81.56 | 19.23 |
| *7 | 13.09 | −0.20 | | | 20.66 |
| 8 | 35.88 | −2.20 | 1.89 | 20.36 | 21.10 |
| 9 | −27.61 | −5.75 | 1.49 | 70.24 | 23.56 |
| 10 | 36.45 | −3.19 | | | 24.46 |
| 11 | −73.01 | −8.01 | 1.50 | 81.55 | 31.54 |
| 12 | 30.64 | −29.11 | | | 32.29 |
| 13 | −39.28 | −7.49 | 1.89 | 20.36 | 36.22 |
| 14 | 385.73 | −0.44 | | | 35.08 |
| 15 | −18.73 | −5.00 | 1.89 | 20.36 | 28.04 |
| 16 | −23.52 | −8.90 | | | 24.72 |
| *17 | 12.11 | −2.20 | 1.50 | 81.56 | 19.57 |
| *18 | −25.26 | −13.70 | | | 18.45 |
| 19 | 28.29 | −2.36 | 1.89 | 20.36 | 19.93 |
| 20 | 17.93 | −15.65 | | | 20.36 |
| 21 | −18.87 | −2.10 | 1.89 | 20.36 | 11.95 |
| 22 | 256.32 | −0.10 | | | 11.38 |
| (STO) 23 | ∞ | −4.39 | | | 11.19 |
| 24 | 15.72 | −2.00 | 1.72 | 29.23 | 9.91 |
| 25 | −937.41 | −2.41 | 1.69 | 54.82 | 10.50 |
| 26 | 13.70 | −3.00 | | | 10.96 |
| 27 | 11.51 | −2.73 | 1.81 | 25.46 | 11.50 |
| 28 | −19.37 | −6.11 | 1.52 | 64.14 | 15.07 |
| 29 | 16.94 | −0.10 | | | 17.34 |
| 30 | −27.27 | −5.00 | 1.50 | 81.55 | 21.91 |
| 31 | 125.32 | −3.31 | | | 22.42 |
| *32 | 268.69 | −5.86 | 1.50 | 81.56 | 22.86 |
| *33 | 16.23 | −1.10 | | | 24.14 |
| 34 | ∞ | −28.95 | 1.72 | 47.93 | 22.46 |
| 35 | ∞ | −2.50 | | | 18.93 |
| IM | | | | | 18.60 |

| | Surface | | | | | | | |
|---|---|---|---|---|---|---|---|---|
| | 1 | 2 | 3 | 6 | 7 | 17 | 18 | 32 | 33 |
| K | −17.10312 | 0 | −0.792845 | 0 | 0 | 0 | 0 | 0 | 0 |
| A | −1.66E−07 | −3.94E−05 | 9.61E−05 | −1.72E−06 | −5.53E−05 | −0.000376 | 4.04E−06 | 6.92E−05 | 6.78E−07 |
| B | −1.16E−11 | 5.51E−07 | −2.11E−06 | −4.64E−08 | −1.95E−07 | 2.05E−06 | 1.52E−06 | 4.59E−07 | 2.83E−07 |
| C | 1.72E−14 | −1.86E−09 | 9.28E−09 | 1.34E−09 | −2.36E−10 | −1.27E−08 | −2.66E−08 | −3.84E−09 | −3.55E−10 |
| D | −2.83E−18 | 2.38E−12 | 6.54E−10 | −1.62E−11 | −9.74E−13 | 1.21E−11 | 1.10E−10 | 5.15E−11 | −1.83E−11 |
| E | 0 | −2.41E−15 | −8.09E−12 | 7.45E−14 | −3.59E−14 | −2.99E−15 | 6.80E−14 | −2.16E−13 | 3.39E−13 |
| F | 0 | −1.28E−18 | −7.57E−15 | 0 | 0 | 0 | 0 | −6.96E−16 | −2.23E−15 |
| G | 0 | 4.08E−20 | 4.14E−17 | 0 | 0 | 0 | 0 | 4.24E−18 | 4.65E−18 |

| | |
|---|---|
| f [mm] | 2.98 |
| FNO | 2.31 |
| Angle of view | 71.8 |

Figure 4:
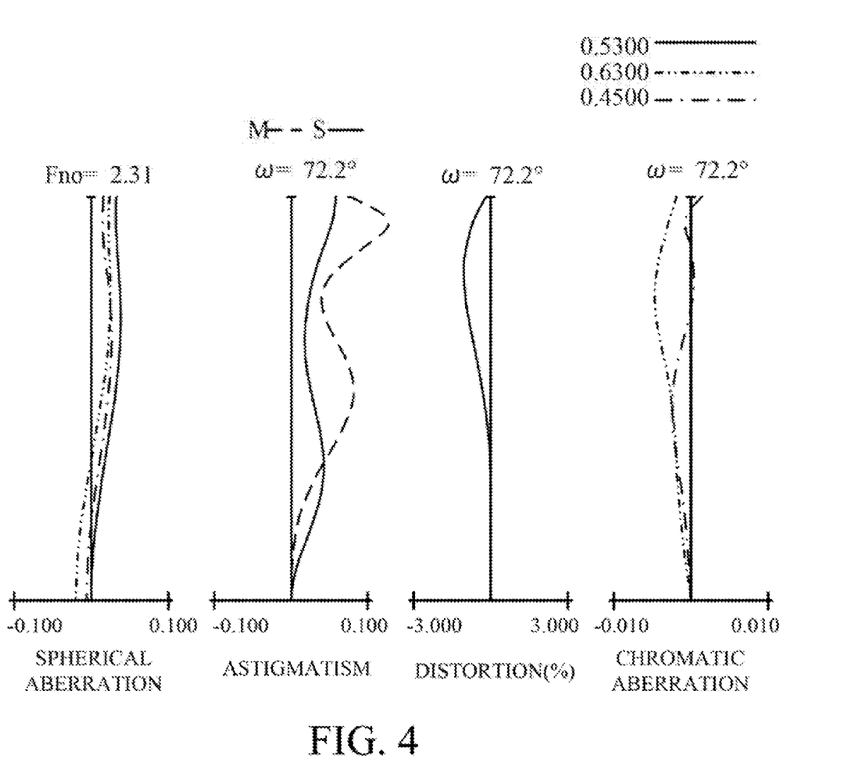
FIG. 4 is a longitudinal aberration diagram of the imaging optical system according to the second embodiment.

FIG. 4 illustrates a longitudinal aberration (an aspherical aberration, astigmatism, distortion and a chromatic aberration of magnification) of the projection optical system according to this embodiment.

Table 4 provides values of the expressions (1) to (5) in this embodiment.

TABLE 4-continued

| | |
|---|---|
| fl1/fl2 | 0.56 |
| ΦG1/ΦGmax | 0.80 |
| D/TL | 0.092 |

Third Embodiment

Figure 5:
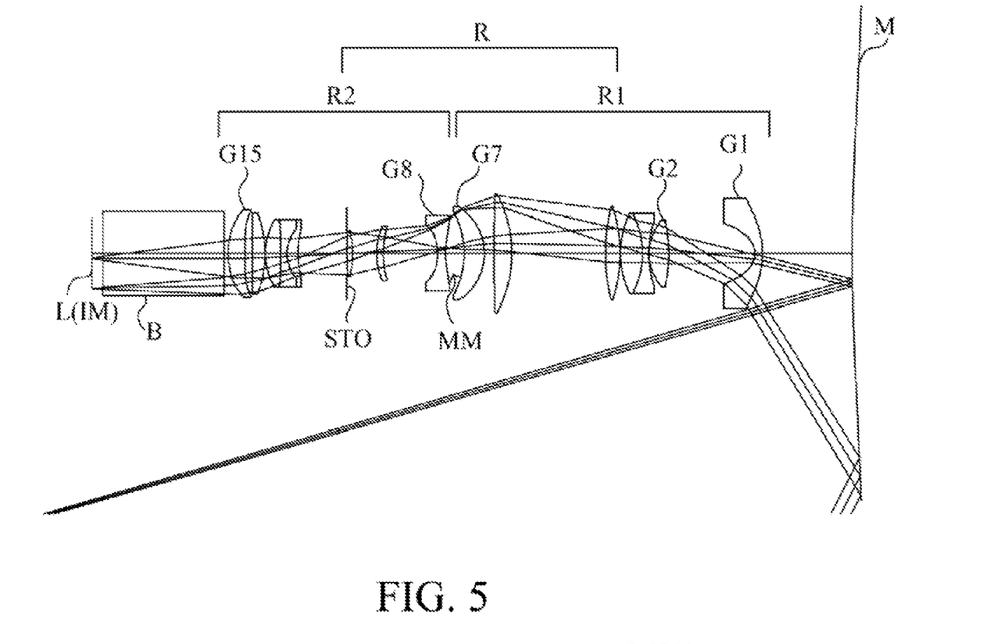
FIG. 5 is a sectional view of an imaging optical system according to a third embodiment of the present invention.

FIG. 5 illustrates a configuration of a projection optical system as an imaging optical system according to a third embodiment. This projection optical system shortens a total length of the optical system and an object distance after scaling the projection optical system according to the first embodiment to 1.5, and further decreases the number of lenses (G1 to G15). Using this projection optical system can greatly shift a light modulation element in a direction perpendicular to an optical axis, and can enhance a degree of freedom of a disposing place of an image projection apparatus relative to a projection surface. Similarly, applying an image pickup optical system having the same configuration to an image pickup apparatus can greatly shift an image pickup element in a direction perpendicular to an optical axis, and can enhance a degree of freedom of a disposing place of an image pickup apparatus relative to an object.

Table 5 provides a numerical example of this embodiment.

Figure 6:
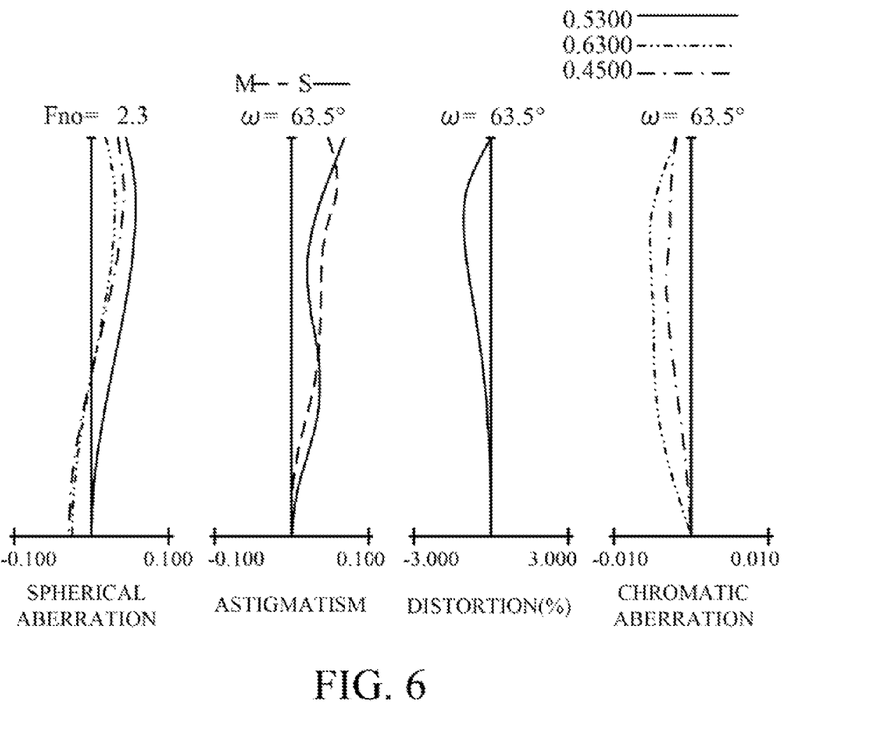
FIG. 6 is a longitudinal aberration diagram of the imaging optical system according to the third embodiment.

FIG. 6 illustrates a longitudinal aberration (an aspherical aberration, astigmatism, distortion and a chromatic aberration of magnification) of the projection optical system according to this embodiment.

Table 6 provides values of the expressions (1) to (5) in this embodiment.

TABLE 6

| | |
|---|---|
| fM [mm] | −332.09 |
| fL [mm] | 8.00 |
| fl1 [mm] | 8.36 |
| fl2 [mm] | 14.99 |
| fL/fM | 0.024 |
| β | −1.09 |
| fl1/fl2 | 0.56 |
| ΦG1/ΦGmax | 0.91 |
| D/TL | 0.167 |

TABLE 5

| Surface Number | R [mm] | d [mm] | nd | νd | Φ ea [mm] |
|---|---|---|---|---|---|
| OB | | 500.00 | | | |
| *1 | 664.18 | −35.33 | REF | REF | 193.42 |
| *2 | −35.31 | −2.94 | 1.69 | 53.20 | 42.18 |
| *3 | −7.88 | −34.05 | | | 24.29 |
| *4 | −64.49 | −7.85 | 1.50 | 81.55 | 24.00 |
| *5 | 18.33 | −0.10 | | | 25.12 |
| 6 | 39.79 | −2.40 | 1.85 | 23.78 | 25.31 |
| 7 | −34.14 | −8.73 | 1.50 | 81.55 | 28.30 |
| 8 | 36.93 | −0.10 | | | 30.34 |
| 9 | −58.93 | −5.83 | 1.50 | 81.55 | 35.47 |
| 10 | 77.20 | −36.90 | | | 35.77 |
| 11 | −50.73 | −6.91 | 1.92 | 18.90 | 46.24 |
| 12 | 1922.87 | −3.90 | | | 45.81 |
| 13 | −22.09 | −8.00 | 1.92 | 18.90 | 35.80 |
| 14 | −35.00 | −7.40 | | | 31.71 |
| *15 | 26.72 | −3.00 | 1.50 | 81.56 | 28.72 |
| *16 | −15.60 | −21.88 | | | 22.38 |
| 17 | 36.38 | −2.57 | 1.92 | 18.90 | 19.81 |
| 18 | 27.10 | −9.56 | | | 20.26 |
| 19 | −46.80 | −2.11 | 1.92 | 18.90 | 17.11 |
| 20 | 112.29 | −0.12 | | | 16.96 |
| (STO) 21 | ∞ | −19.16 | | | 16.80 |
| 22 | 44.44 | −4.42 | 1.52 | 64.14 | 17.87 |
| 23 | 15.15 | −2.40 | 1.92 | 18.90 | 18.94 |
| 24 | −161.94 | −6.12 | 1.70 | 55.53 | 23.61 |
| 25 | 26.95 | −0.10 | | | 25.80 |
| 26 | −44.26 | −5.00 | 1.52 | 64.14 | 30.70 |
| 27 | −827.58 | −2.95 | | | 31.19 |
| *28 | 1000.00 | −6.58 | 1.69 | 31.16 | 31.53 |
| *29 | 34.69 | −1.75 | | | 33.35 |
| 30 | ∞ | −47.76 | 1.72 | 47.93 | 32.40 |
| 31 | ∞ | −4.0647 | | | 28.74 |
| IM | | | | | 28.20 |

| | 1 | 2 | 3 | 4 | 5 | 15 | 16 | 28 | 29 |
|---|---|---|---|---|---|---|---|---|---|
| K | −3.11E+02 | 0.00E+00 | −0.700936 | 0 | 0 | 0 | 0 | 0 | 0 |
| A | 1.49E−08 | −6.48E−06 | −9.03E−06 | 1.01E−06 | −1.78E−05 | −0.000101 | −1.03E−05 | 1.91E−05 | 7.49E−06 |
| B | −3.82E−12 | 4.34E−08 | −9.81E−08 | −4.61E−08 | −4.32E−08 | 2.84E−07 | 2.41E−07 | 4.16E−08 | 2.87E−08 |
| C | 2.72E−16 | −5.61E−11 | −7.46E−10 | 3.46E−10 | −2.19E−10 | −2.68E−10 | −6.92E−10 | −1.21E−10 | −2.17E−11 |
| D | −7.09E−21 | 3.70E−14 | 1.73E−11 | −1.39E−12 | 1.02E−12 | −1.01E−12 | 5.77E−12 | 4.92E−13 | −1.78E−13 |
| E | 0 | −1.38E−18 | −3.87E−14 | 2.63E−15 | −2.41E−15 | 1.98E−15 | −3.51E−14 | −5.99E−16 | 1.47E−15 |
| F | 0 | −3.33E−20 | −2.52E−17 | 0 | 0 | 0 | 0 | −3.99E−19 | −3.39E−18 |
| G | 0 | 3.62E−23 | 2.26E−20 | 0 | 0 | 0 | 0 | 1.39E−21 | 2.93E−21 |

| | |
|---|---|
| f [mm] | 7.03 |
| FNO | 2.31 |
| Angle of view [deg] | 63.2 |

COMPARATIVE EXAMPLE

Table 7 provides various numerical values and values of the expression (1) to (5) of the projection optical system disclosed in the first embodiment (hereinafter, referred to as "first comparative example") and the second embodiment (hereinafter, referred to as "second comparative example") of Japanese Patent No. 5484098. In the first and second comparative examples, the conditions of the expressions (1), (3) and (5) fails to be satisfied (this is expressed by "x" in Table 7) and whether or not satisfying the conditions of the expressions (2) and (4) is unknown.

TABLE 7

|  | Embodiments | First comparative example | Second comparative example |  |
| --- | --- | --- | --- | --- |
| fL |  | −16.4 | −17.604 |  |
| fM |  | −11.592 | −11.436 |  |
| β |  | unknown | unknown |  |
| fl1 |  | 51.8 | 45.0265 |  |
| fl2 |  | 23.6 | 27.5543 |  |
| ΦG1 |  | unknown | unknown |  |
| ΦGmax |  | unknown | unknown |  |
| D |  | 192.09 | 181.74 |  |
| TL |  | 542.09 | 531.74 |  |
| fL/fM | 0.01<~<0.5 | 1.41 | 1.54 | x |
| β | −2.0<~<−0.5 | unknown | unknown |  |
| fl1/fl2 | 0.3<~<0.8 | 2.19 | 1.63 | x |
| ΦG1/ΦGmax | 0.2<~<2.0 | unknown | unknown |  |
| D/TL | 0.01<~<0.30 | 0.35 | 0.34 | x |

According to each embodiment, the imaging optical system, which includes the refractive optical system internally forming the intermediate real image and a reflective optical system, has a wide angle of view and properly sets a power ratio of the refractive optical system and the convex mirror so as to excellently correct various aberrations using the compact concave mirror. Using such an imaging optical system can provide an optical apparatus, such as an image projection apparatus, that is compact and has an optical high performance.

The image projection apparatus including the light modulation element and the imaging optical system projecting light from the light modulation element onto the projection surface may further include an image pickup apparatus having an image pickup element and an image pickup optical system forming the image of the projection surface on the image pickup element.

Further, when including the convex mirror on the most enlargement side conjugate surface side, the reflective optical system may include only the convex mirror as described in each embodiment.

In addition, the reflective optical system includes a plurality of mirrors, and the mirror disposed on the most enlargement side conjugate surface side of the plurality of mirrors may be the convex mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-123493, filed on Jun. 19, 2015, and 2016-117815, filed on Jun. 14, 2016 which are hereby incorporated by reference herein in their entirety.

What is claimed is:

1. An imaging optical system that images an image on one conjugate surface of an enlargement side conjugate surface and a reduction side conjugate surface onto the other conjugate surface, the imaging optical system comprising:
    in order from the reduction side conjugate surface to the enlargement side conjugate surface,
    a refractive optical system; and
    a reflective optical system,
    wherein the refractive optical system forms an intermediate real image at an intermediate imaging position inside the refractive optical system,
    wherein the reflective optical system includes a convex mirror disposed closest to the enlargement side conjugate surface, and
    wherein the following conditional expression is satisfied:

$$0.01 \leq |fL/fM| \leq 0.50$$

where fL is a focal length of the refractive optical system, and fM is a focal length of the reflective optical system.

2. The imaging optical system according to claim 1, wherein the reflective optical system is configured by the convex mirror.

3. The imaging optical system according to claim 1, wherein the following conditional expression is satisfied:

$$-2.0 \leq \beta \leq -0.5$$

where β is a lateral magnification between an image on the reduction side conjugate surface and the intermediate real image, and the lateral magnification β is less than −1 when the intermediate real image is larger than the image on the reduction side conjugate surface.

4. The imaging optical system according to claim 1, wherein the following conditional expression is satisfied:

$$0.3 \leq |f11/f12| \leq 0.8$$

where, of the refractive optical system, f11 is a focal length of a first partial refractive optical system disposed between the reflective optical system and the intermediate imaging position, and f12 is a focal length of a second partial refractive optical system disposed between the intermediate imaging position and the reduction side conjugate surface.

5. The imaging optical system according to claim 1, wherein, when a lens disposed on the most reflective optical system side of the refractive optical system is a first lens, the first lens has an aspherical shape.

6. The imaging optical system according to claim 5, wherein the following conditional expression is satisfied:

$$0.2 \leq \Phi G1/\Phi Gmax \leq 2.0$$

where ΦG1 is an effective diameter of the first lens, and ΦGmax is an effective diameter of a lens having the largest effective diameter in lenses other than the first lens of the refractive optical system.

7. The imaging optical system according to claim 5, wherein the following conditional expression is satisfied:

$$0.01 \leq D/TL \leq 0.30$$

where D is a distance between the reflective optical system and the first lens, and TL is a total length of the imaging optical system.

8. The imaging optical system according to claim 5, wherein two lights respectively having a maximum reflection angle and a minimum reflection angle in the reflective optical system do not cross each other between the first lens and the reflective optical system.

9. An optical apparatus comprising:

an imaging optical system that images an image on one conjugate surface of an enlargement side conjugate surface and a reduction side conjugate surface onto the other conjugate surface, wherein the imaging optical system includes, in order from the reduction side conjugate surface to the enlargement side conjugate surface, a refractive optical system and a reflective optical system, wherein the refractive optical system forms an intermediate real image at an intermediate imaging position inside the refractive optical system, wherein the reflective optical system includes a convex mirror disposed closest to the enlargement side conjugate surface, and wherein the following conditional expression is satisfied:

$$0.01 \le |fL/fM| \le 0.50$$

where fL is a focal length of the refractive optical system, and fM is a focal length of the reflective optical system.

10. An image projection apparatus comprising:

a light modulation element that modulates light; and an imaging optical system that projects light from the light modulation element onto a projection surface, wherein the imaging optical system images an image on one conjugate surface of an enlargement side conjugate surface and a reduction side conjugate surface onto the other conjugate surface, wherein the imaging optical system includes, in order from the reduction side conjugate surface to the enlargement side conjugate surface, a refractive optical system and a reflective optical system, wherein the refractive optical system forms an intermediate real image at an intermediate imaging position inside the refractive optical system, wherein the reflective optical system includes a convex mirror disposed closest to the enlargement side conjugate surface, and wherein the following conditional expression is satisfied:

$$0.01 \le |fL/fM| \le 0.50$$

where fL is a focal length of the refractive optical system, and fM is a focal length of the reflective optical system.

11. The image projection apparatus according to claim 10, further comprising an image pickup apparatus including an image pickup element and an image pickup optical system that forms an image of the projection surface on the image pickup element.

* * * * *